United States Patent [19]
Petzl et al.

[11] Patent Number: 5,071,716
[45] Date of Patent: Dec. 10, 1991

[54] CASING FOR CYLINDRICAL ELECTRICAL BATTERIES OF DIFFERENT DIAMETERS

[75] Inventors: Paul Petzl, Saint Vincent de Mercuze; Pierre Petzl, Saint Nazaire les Eymes, both of France

[73] Assignee: Petzl SA, Crolles, France

[21] Appl. No.: 550,307

[22] Filed: Jul. 9, 1990

[30] Foreign Application Priority Data

Jul. 19, 1989 [FR] France ................. 89 09829

[51] Int. Cl.[5] ................ H01M 2/10
[52] U.S. Cl. ................ 429/9; 429/99
[58] Field of Search ........... 429/9, 97, 99

[56] References Cited

U.S. PATENT DOCUMENTS

| | | | |
|---|---|---|---|
| 998,895 | 7/1911 | Harvey | 429/97 X |
| 2,357,274 | 8/1944 | Tresise et al. | |
| 4,232,260 | 11/1980 | Lambkin | |
| 4,853,302 | 8/1989 | Yamanaka et al. | 429/99 |
| 4,863,812 | 9/1989 | Ueda et al. | 429/99 X |
| 4,965,141 | 10/1990 | Suzuki | 429/99 X |

FOREIGN PATENT DOCUMENTS 2499319 8/1982 France .

OTHER PUBLICATIONS

Patent Abstracts of Japan, vol. 6, No. 60(E-102)[938], 5/82, "Supporting Device for Battery", H. Kikuchi.
Patent Abstracts of Japan vol. 6, No. 91(E-109) [969], 5/82, "Device for Holding Battery", T. Ogi.
Patent Abstracts of Japan, vol. 7, No. 129 (E-179) [1274], 6/83, "Power-Source Accommodating Device", S. Itagaki.

*Primary Examiner*—Stephen J. Kalafut
*Attorney, Agent, or Firm*—Stevens, Davis, Miller & Mosher

[57] ABSTRACT

A casing for cylindrical electrical batteries of different diameters is equipped with adjustment means with pivoting spacers designed to occupy a first inactive position or a second active position in order to keep the positioning of the longitudinal axis of each battery, regardless of its diameter.

5 Claims, 4 Drawing Sheets

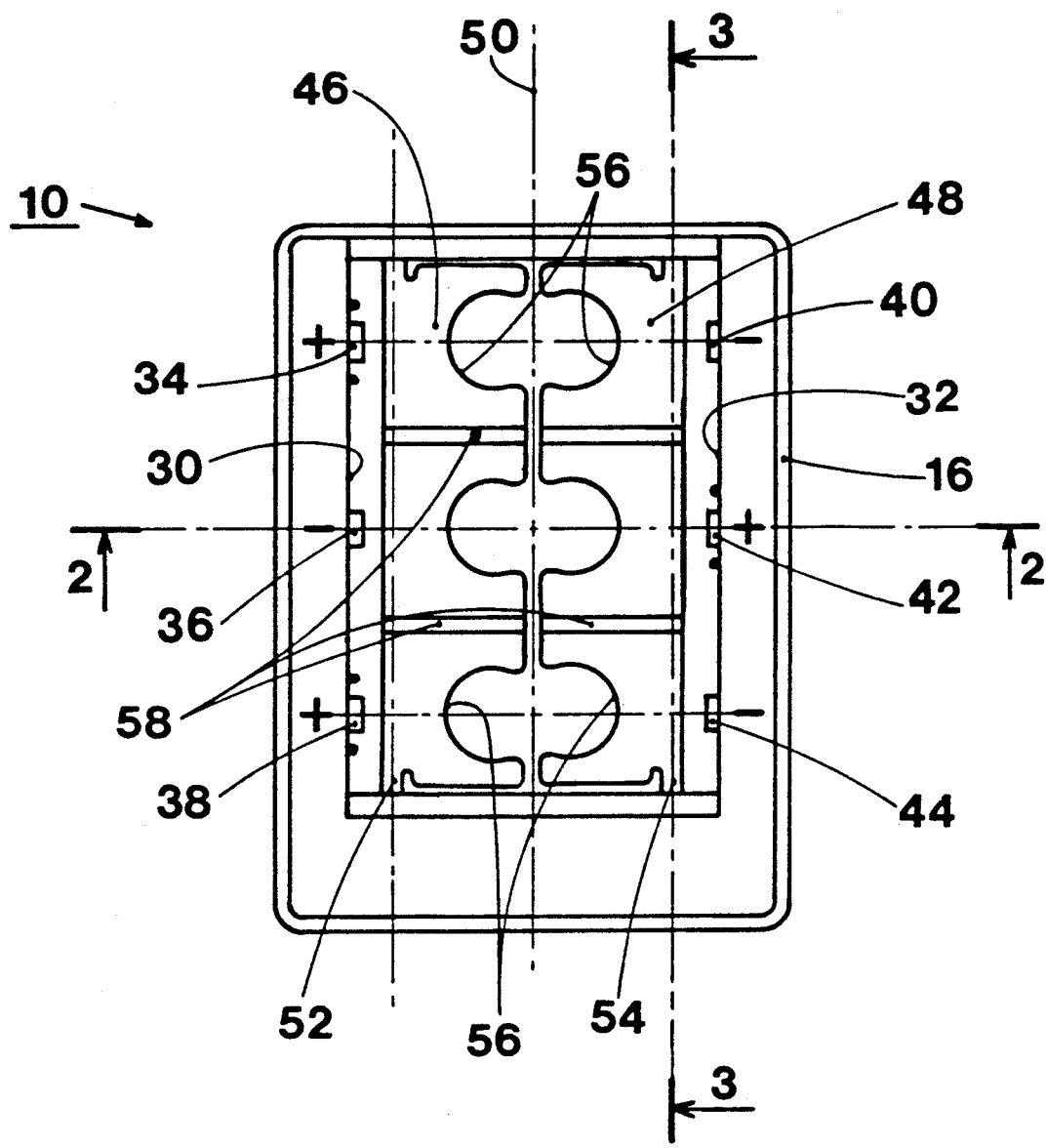
Fig : 1

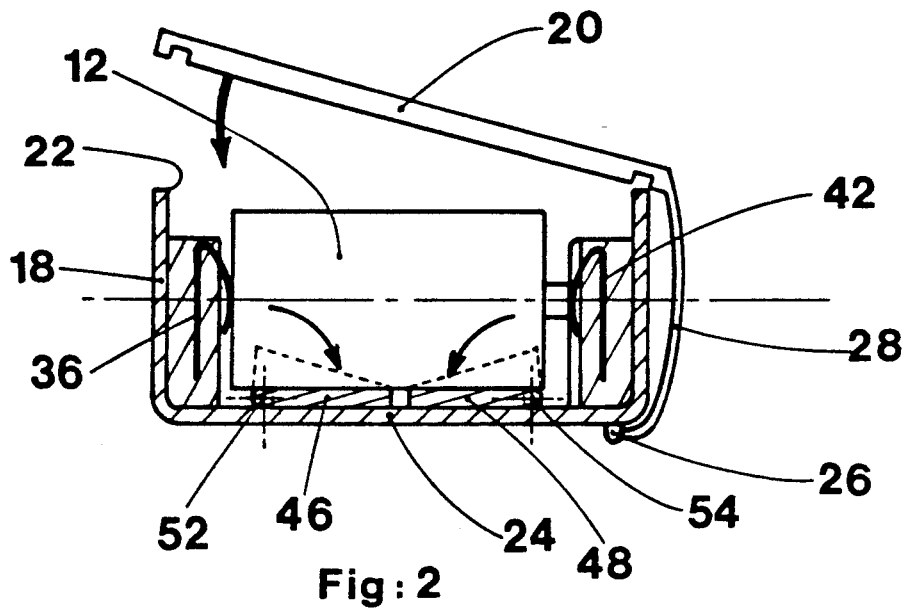
Fig: 2
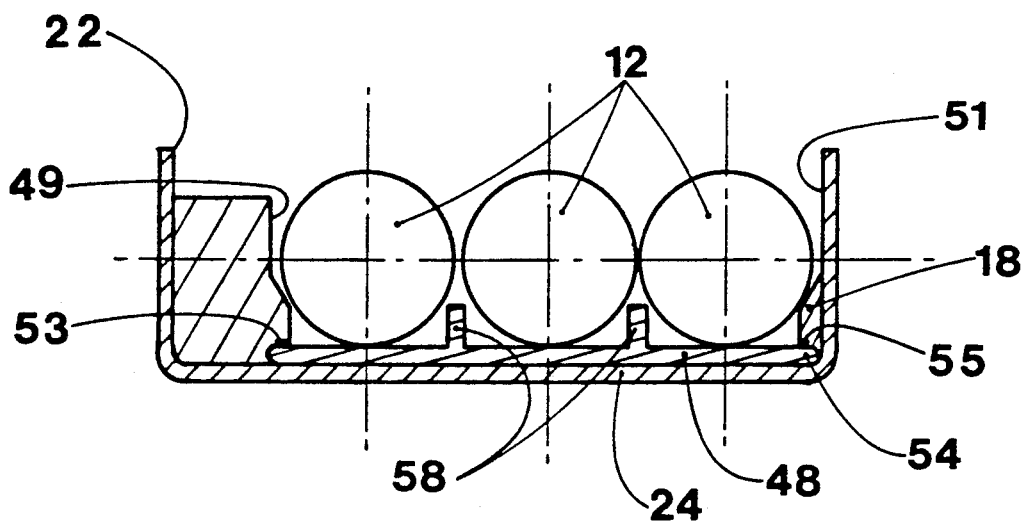
Fig: 3

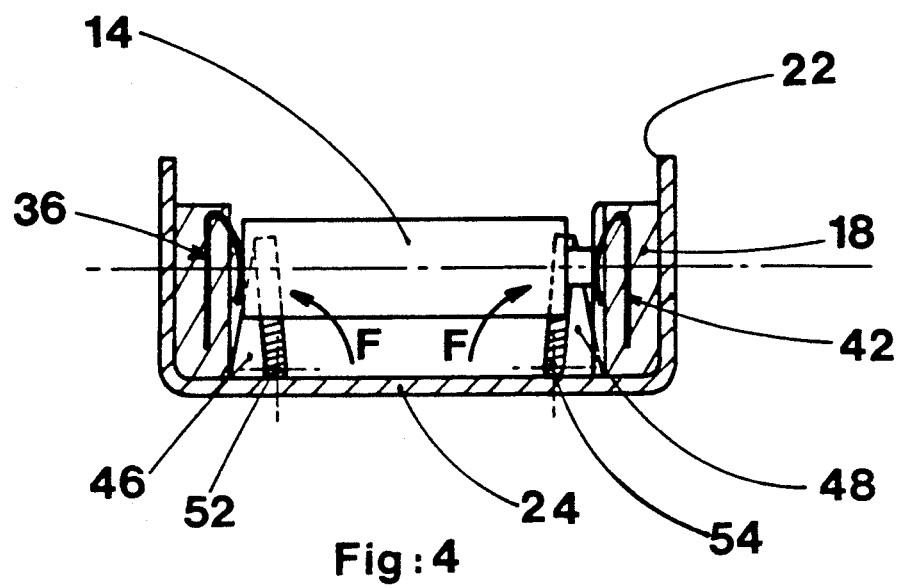
Fig: 4
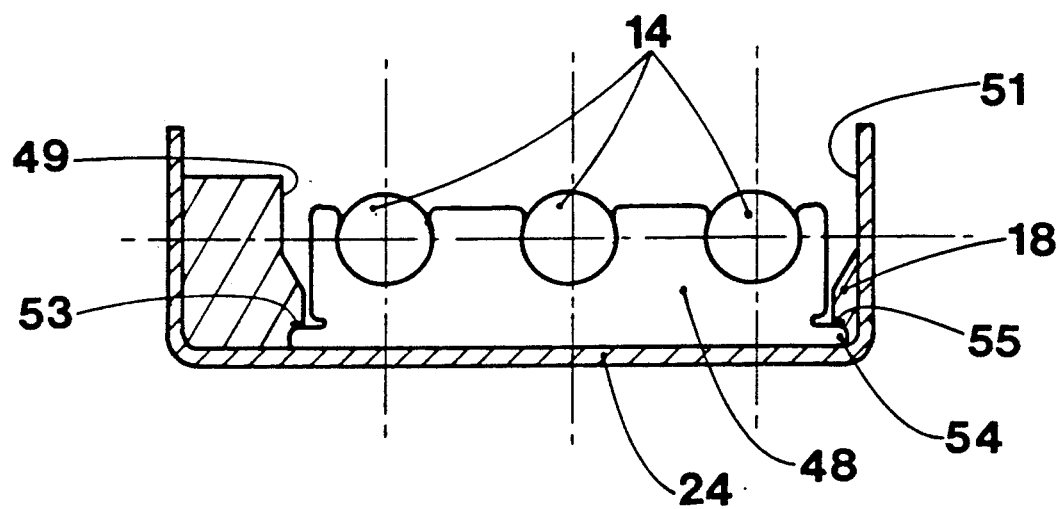
Fig: 5

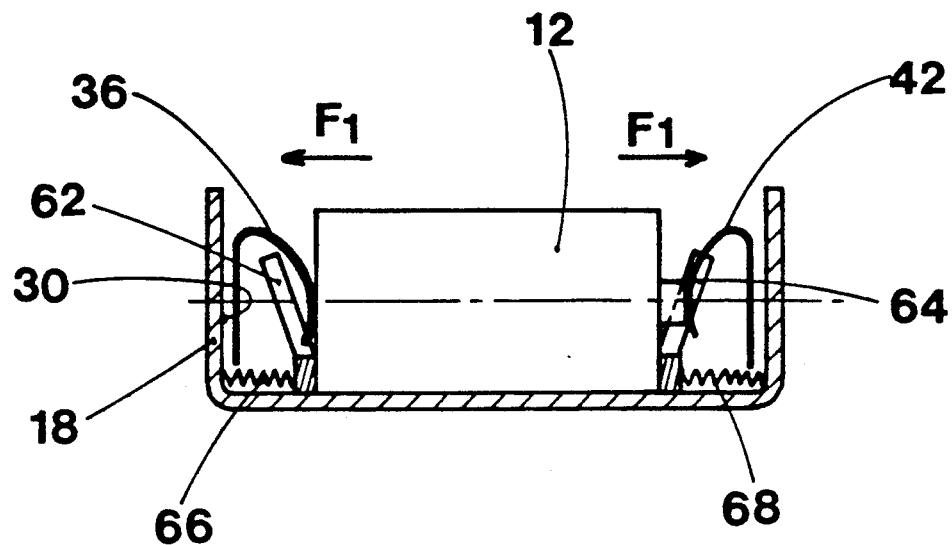
Fig : 6
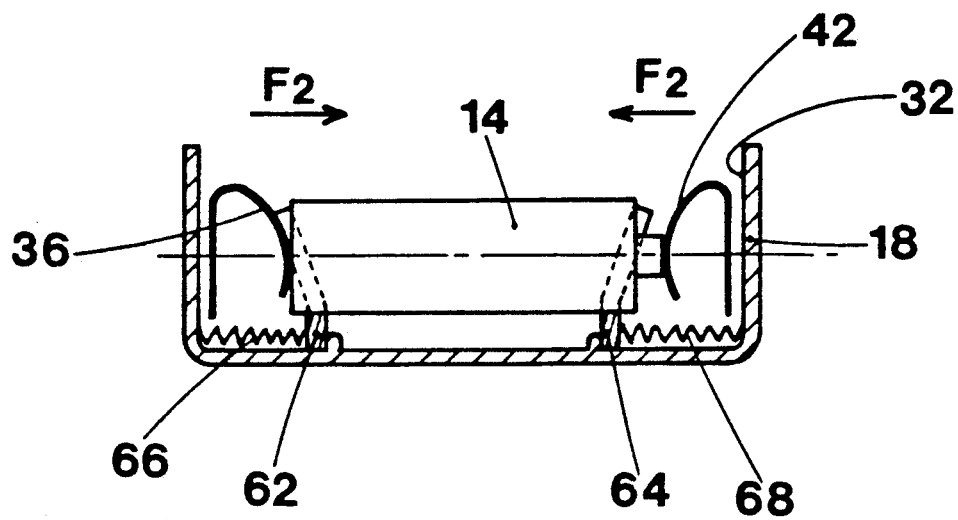
Fig : 7

CASING FOR CYLINDRICAL ELECTRICAL BATTERIES OF DIFFERENT DIAMETERS

BACKGROUND OF THE INVENTION

The invention relates to a casing housing a plurality of cylindrical-shaped electrical batteries of the same length, comprising an insulating enclosure equipped with two series of fixed contact blades, located at regular intervals along two opposite large side faces inside the casing, and presenting alternate polarities to enable the batteries to be coupled in series when the latter are inserted in the enclosure.

A state-of-the-art casing enables a flat battery and several cylindrical batteries to be accommodated. The use of cylindrical batteries requires a special adapter to be fitted, due to the fact that the contact blades are different and distinct depending on whether the batteries are of the flat or cylindrical type. The use of a flat battery necessarily involves removing the adapter. The latter constitutes an accessory which may be lost or unavailable when the batteries have to be changed or replaced.

The object of the invention consists in achieving a universal casing which can be easily converted to suit the diameter of the cylindrical batteries used.

SUMMARY OF THE INVENTION

The casing is characterized in that adjustment means are arranged inside the casing to occupy a first inactive position or a second active position, enabling the positioning of the longitudinal axis of each battery to be kept, regardless of their diameter.

Adaptation of the casing to suit the type of batteries is achieved very easily by modification of the position of the adjustment means which are built into the casing.

According to a first embodiment, the adjustment means comprise a pair of spacers mounted with limited pivoting between the first and second positions, each spacer having an articulation spindle inserted with clearance in at least one orifice of the casing.

The spacers are animated with two opposed pivoting movements, being located symmetrically with respect to the trace mid-plane parallel to the two side faces of the enclosure, the movement from the first position to the second position, and vice-versa, being achieved by an angular movement at right-angles, in which the spacers are either flattened horizontally against the base-plate of the casing in the first position, or positioned vertically facing said opposite side faces in the second position.

According to a second embodiment, the adjustment means comprise a pair of semi-mobile spacers urged in reverse translation by compression springs bearing on the opposite side faces of the casing, the spacers being the maximum distance apart in the first position, and moved towards each other in the second position, respectively when large batteries and small batteries of smaller diameter are inserted.

BRIEF DESCRIPTION OF THE DRAWINGS

Other advantages and features will become more clearly apparent from the following description of two illustrative embodiments of the invention, given as non-restrictive examples only and represented in the accompanying drawings, in which:

FIG. 1 is a plane view of the casing, with the cover and the batteries removed;

FIGS. 2 and 3 represent cross-sectional views along the lines 2—2 and 3—3 of FIG. 1 for the use of large batteries;

FIGS. 4 and 5 are identical views to those of FIGS. 2 and 3, for the use of small batteries;

FIGS. 6 and 7 show identical views to those of FIGS. 2 and 4, for an alternative embodiment.

DESCRIPTION OF THE PREFERRED EMBODIMENT

In FIGS. 1 to 5, a parallelipipedic casing 10 housing a plurality of cylindrical electrical batteries 12, 14 comprises an enclosure 16 made of moulded insulating material. The enclosure 16 is made up of a support frame 18 for positioning the batteries 12, 14, and a sealing cover 20 designed to fit the upper orifice 22 of the support frame 18 opposite the base-plate 24. The cover 20 is connected to an attachment 26 of the base-plate 24 by a flexible link 28 acting as a hinge (see FIG. 2).

The two opposing large side faces 30, 32 inside the enclosure 16 are equipped with two series of fixed contact blades 34, 36, 38; 40, 42, 44, of alternate polarities, so as to enable the batteries 12 or 14 to be coupled in series when they are inserted in the support frame 18.

The contact blades 34 to 44 are identical and extend perpendicularly to the base-plate 24, each of them having a deformable elastic part to ensure a predetermined contact pressure with the opposite ends of the corresponding batteries 12, 14. Each pair of adjacent contact blades 42, 44; 34, 36 are interconnected at their bases by a connecting strip (not shown). The other two contact blades 38, 40 constitute the positive and negative poles of the direct current power supply, which is capable of supplying a lamp (not shown), notably via an electric cable. The longitudinal axis of each battery 12, 14 is disposed in alignment with two contact blades 34, 40; 36, 42; 38, 44 of different polarities.

Inside the enclosure 16 there is located a pair of positioning spacers 46, 48, arranged symmetrically with respect to the trace mid-plane 50 parallel to the large side faces 30, 32. The base of each spacer 46, 48 is equipped with an articulation spindle 52, 54 inserted with clearance in aligned bearings 53, 55 arranged in the opposite small side faces 49, 51 of the support frame 18. The two spindles 52, 54 extend in parallel and in the vicinity of the large side faces 30, 32.

Each spacer 46, 48 can occupy a first lowered inactive position, and a second raised active position, depending on the diameter of the batteries 12, 14 used. Movement of the spacers 46, 48 from the first position to the second position, and vice-versa, requires two opposite pivoting movements at right-angles around the spindles 52, 54.

In the first inactive position, the spacers 46, 48 are flattened horizontally against the base-plate 24 of the support frame 18 (FIG. 1) to enable three large batteries 12 to be inserted (FIGS. 2 and 3) between the pairs of aligned contact blades 34, 40; 36, 42; 38, 44 of opposite polarities.

Each spacer 46, 48 comprises housing notches 56 of semi-cylindrical shape, whose diameter corresponds appreciably to that of the small batteries 14. One of the faces of each spacer 46, 48 is provided with salient lateral ribs 58, imbricated between the successive notches 56.

Pivoting of the spacers 46, 48 to the second active position (see arrow F, FIG. 4) brings them opposite the internal large side faces 30, 32, with a predetermined lateral clearance due to the presence of the ribs 58. The spacers 46, 48 then extend in a direction perpendicular to the base-plate 24, to enable small batteries 14, each having an identical length to that of the large batteries 12 but a smaller diameter, to be inserted in the notches (FIGS. 4 and 5).

The depth of the notches 56 in the spacers 46, 48 is chosen so as to keep the position of the longitudinal axis of the small batteries 14 (FIGS. 4 and 5) with respect to that of the large batteries 12 (FIGS. 2 and 3). This results in a good electrical contact of the batteries 12, 14 with the corresponding fixed contact blades 34, 40; 36, 42; 38, 44, in both the first and second positions of the spacers 46, 48.

According to the alternative embodiment in FIGS. 6 and 7, the batteries 12, 14 are positioned by two semi-mobile spacers 62, 64 urged in reverse translation by compression springs 66, 68 bearing on the opposite side faces 30, 32. In the first position (FIG. 6), the spacers 62, 64 are the maximum distance apart in the opposing directions of the arrows F1 when large batteries 12 are fitted. In the second position (FIG. 7), the small batteries 14 are positioned on diverging inclined ramps of the spacers 62, 64. This results in an automatic movement bringing the spacers 62, 64 towards each other in the directions of the arrows F2 due to the elastic relaxation of the springs 66, 68.

We claim:

1. A casing capable of selectively housing a first set and a second set of cylindrical electrical batteries having the same length, and comprising an insulating enclosure with two opposite large side faces, containing:
   two series of contact blades securely fixed at regular intervals along two opposite large side faces and presenting alternate polarities enabling the batteries to be coupled in series when the latter are inserted in the enclosure;
   each battery of the first or second set extending perpendicularly to the two large side faces according to a longitudinal axis disposed in alignment with two corresponding contact blades of different polarities;
   adjustment means located within the casing to occupy a first inactive position or a second active position depending on the diameter of the batteries of the first and second sets, the movement from the first position to the second position, and vice-versa, enabling the same positioning of the longitudinal axis of the batteries to be kept, regardless of their diameter;
   each set having the same number of batteries.

2. A casing according to claim 1, wherein the adjustment means comprise a pair of pivotable spacers located symmetrically with respect to the trace mid-plane, parallel to the two side faces of the enclosure, the movement from the first position to the second position, and vice-versa, being achieved by an angular movement at right-angles, in which said spacers are either flattened horizontally against the base-plate of the casing in the first position, or positioned vertically facing said opposite side faces in the second position, each spacer comprising:
   an articulation spindle inserted with clearance in an orifice of the casing;
   and semi-cylindrical notches each having a diameter corresponding appreciably to that of the batteries of smaller diameter, the number of notches of a spacer being identical to that of the batteries contained in the casing.

3. A casing according to claim 2, wherein one face of each spacer is provided with salient ribs inserted between the successive notches and arranged to provide a lateral separation with respect to the side faces of the casing when said adjustment means are in said second position.

4. A casing according to claim 1, wherein the adjustment means comprise a pair of semi-mobile spacers urged in reverse translation by compression springs bearing on the opposite side faces of the casing, the spacers being the maximum distance apart in the first position, and moved towards each other in the second position, respectively when batteries of said first or second set are inserted.

5. A casing according to claim 4, wherein each spacer is provided with an inclined ramp for positioning of the batteries of smaller diameter.

* * * * *